United States Patent
Ezekoye et al.

(10) Patent No.: US 10,052,601 B2
(45) Date of Patent: Aug. 21, 2018

(54) SYSTEMS AND METHODS OF CONTINUOUSLY PRODUCING ENCAPSULATED LIQUID WATER

(71) Applicant: Board of Regents, The University of Texas System, Austin, TX (US)

(72) Inventors: Ofodike A. Ezekoye, Austin, TX (US); Jan-Michael Cabrera, Schertz, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/639,031

(22) Filed: Jun. 30, 2017

(65) Prior Publication Data

US 2017/0296991 A1    Oct. 19, 2017

Related U.S. Application Data

(62) Division of application No. 14/816,139, filed on Aug. 3, 2015, now Pat. No. 9,724,663.

(60) Provisional application No. 62/033,208, filed on Aug. 5, 2014.

(51) Int. Cl.
| | |
|---|---|
| *B01D 45/16* | (2006.01) |
| *B01F 15/02* | (2006.01) |
| *B01F 3/12* | (2006.01) |
| *B01F 5/06* | (2006.01) |
| *B01F 15/00* | (2006.01) |

(52) U.S. Cl.
CPC .......... *B01F 15/0238* (2013.01); *B01D 45/16* (2013.01); *B01F 3/12* (2013.01); *B01F 3/1221* (2013.01); *B01F 3/1271* (2013.01); *B01F 5/06* (2013.01); *B01F 15/00136* (2013.01)

(58) Field of Classification Search
CPC .......... B01D 45/16; B01F 15/00; B01F 15/02; B01F 3/12; B01F 5/06; B01F 15/00136; B01F 15/0238; B01F 3/1221; B01F 3/1271
See application file for complete search history.

(56) References Cited

U.S. PATENT DOCUMENTS

| | | | |
|---|---|---|---|
| 3,393,155 A * | 7/1968 | Schutte | A61K 9/143 252/2 |
| 3,464,926 A | 9/1969 | Vandegaer et al. | |
| 3,951,824 A * | 4/1976 | Maxson | C09K 8/05 166/275 |
| 4,008,170 A | 2/1977 | Allan | |
| 5,342,597 A | 8/1994 | Tunison | |
| 5,482,720 A | 1/1996 | Murphy et al. | |
| 6,413,548 B1 * | 7/2002 | Hamer | A61K 8/11 424/489 |
| 6,696,034 B2 | 2/2004 | Nozawa et al. | |
| 6,780,507 B2 | 8/2004 | Toreki et al. | |
| 7,072,743 B2 | 7/2006 | Shajii et al. | |
| 8,192,841 B2 | 6/2012 | Amundson et al. | |
| 8,333,914 B2 | 12/2012 | Pitsch et al. | |
| 2004/0028710 A1 | 2/2004 | Oka et al. | |
| 2005/0084510 A1 | 4/2005 | Carson | |
| 2005/0233074 A1 | 10/2005 | Dalziel et al. | |
| 2014/0120178 A1 | 5/2014 | Hines et al. | |

FOREIGN PATENT DOCUMENTS

| | | |
|---|---|---|
| CN | 102671591 | 3/2014 |

OTHER PUBLICATIONS

McHale et al., Liquid marbles: Principles and applications, Soft Matter 7 (2011) 5473-5481.
Binks et al., Phase inversion of particle-stabilized materials from foams to dry water, Nature Materials 5 (2006) 865-869.
Taylan et al., Rheological Properties of "Dry Water", ASME 6 (2011) 229-235.
International Search Report and Written Opinion, dated Nov. 9, 2015, received in connection with related International Application No. PCT/US15/43378.

* cited by examiner

Primary Examiner — Irina S Zemel
(74) Attorney, Agent, or Firm — Meunier Carlin & Curfman LLC

(57) ABSTRACT

Disclosed are systems and methods for continuously producing dry water from silica and water and from silica, sodium bicarbonate, and water.

5 Claims, 4 Drawing Sheets

SYSTEMS AND METHODS OF CONTINUOUSLY PRODUCING ENCAPSULATED LIQUID WATER

CROSS REFERENCE TO RELATED APPLICATIONS

This application is a divisional application of U.S. application Ser. No. 14/816,139, filed Aug. 3, 2015, which claims priority to U.S. Provisional Patent Application No. 62/033,208, entitled "Systems and Methods of Continuously Producing Encapsulated Liquid Water," and filed Aug. 5, 2014, the content of each are herein incorporated by reference in their entireties.

BACKGROUND

"Dry water", which is the name currently given to a water droplet encapsulated in silica particles, is currently produced using batch processing, whereby a fixed ratio of silica and water are added to and mixed in a mixing chamber. The resultant product is a silica-encapsulated water based product that is 90% to 95% water by mass. Batch processing has limited the production of dry water to the laboratory scale. FIG. 1 illustrates a schematic of a dry water particle 100.

U.S. Pat. No. 4,008,170 describes a batch processing method for producing dry water. The patent also mentions that dry water may be useful for fire suppression, but it does not disclose how it may be applied to a fire. Furthermore, batch produced dry water using conventional methods can result in phase separation when the dry water is flowed through a conduit or orifice. In addition, when stored dry water is exposed to ambient air, the water evaporates over time.

Thus, there is a need in the art for improved systems and methods for producing dry water.

BRIEF SUMMARY

Various implementations include systems and methods for continuously producing "dry water" (or silica-encapsulated water). In particular, certain implementations include a single air stream that is used to cause liquid water, silica particles, and excess air to flow into a mixing chamber in which the silica particles and water are subjected to a high shear rate to produce silica-encapsulated water. Following production of the silica-encapsulated water in the mixing chamber, the air stream causes the silica-encapsulated water to flow from the mixing chamber to a gas cyclone separator, and the silica-encapsulated water is separated from the excess air in the cyclone separator. Continuous production of silica-encapsulated water can be useful for various end uses, such as fire suppression, cosmetics, pharmaceuticals, or gas storage, and it mitigates the potential for the silica-encapsulated water to destabilize (or separate from the silica particles).

Other various implementations include liquid water encapsulated with silica and sodium bicarbonate. To produce silica and sodium bicarbonate encapsulated water, the water is partially encapsulated with hydrophobic silica, and the partially encapsulated water is then mixed with hydrophobic sodium bicarbonate to further encapsulate the water, according to certain implementations. In one implementation, the ratio of liquid water to sodium bicarbonate to silica is about 88:8:4. The sodium bicarbonate and silica encapsulated water can be produced using batch processing or continuous processing systems and methods.

According to various implementations, a system for continuously producing silica-encapsulated liquid water includes a driving gas source, a silica reservoir configured for holding silica particles therein, a liquid water reservoir configured for holding liquid water therein, and a mixing chamber configured for receiving liquid water and silica and blending them such that liquid water droplets are encapsulated by the silica particles. The driving gas source is configured for supplying gas to the liquid water reservoir to force the flow of water from the liquid water reservoir to the mixing chamber, to the silica reservoir to force the flow of silica particles from the silica reservoir to the mixing chamber, and to the mixing chamber to force the flow of silica-encapsulated water out of the mixing chamber via a silica-encapsulated water outlet. The ratio of liquid water to silica is between about 90:10 to about 98:2, according to some implementations.

In certain implementations of the system, the mixing chamber is a first mixing chamber and the system further includes a sodium bicarbonate reservoir configured for holding sodium bicarbonate particles therein and a second mixing chamber disposed between the first mixing chamber and the gas cyclone separator. The second mixing chamber includes a silica-encapsulated water inlet configured for receiving silica-encapsulated water from the first mixing chamber and a sodium bicarbonate inlet configured for receiving sodium bicarbonate particles from the sodium bicarbonate reservoir. The second mixing chamber is configured for blending the sodium bicarbonate particles with the silica-encapsulated water such that the sodium bicarbonate particles further encapsulate the silica-encapsulated water.

In addition, various implementations includes a microparticle that includes a core and a shell surrounding the core. The core includes water, and the shell includes silica and or sodium bicarbonate. The microparticle is at least about 90% water by mass.

Additional advantages will be set forth in part in the description that follows and the Figures, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects of the invention and together with the description serve to explain the principles of the invention.

DETAILED DESCRIPTION

Various implementations include systems and methods for continuously producing silica encapsulated water, and silica and sodium bicarbonate encapsulated water. In particular, certain implementations include a single air stream that is used to cause liquid water, silica particles, and excess air to flow into a mixing chamber in which the silica particles and water are subjected to a high shear rate to produce silica-encapsulated water. Following production of the silica-encapsulated water in the mixing chamber, the air stream causes the silica-encapsulated water to flow from the mixing chamber to a gas cyclone separator, and the silica-encapsulated water is separated from the excess air in the cyclone separator. Continuous production of silica-encapsulated water can be useful for various end uses, such as fire suppression, cosmetics, pharmaceuticals, or gas storage, and it mitigates the potential for the encapsulated water to destabilize (or separate from the silica particles). Other various implementations include liquid water encapsulated with silica and sodium bicarbonate. To produce silica and sodium bicarbonate encapsulated water, the water is partially encapsulated with silica, e.g., as disclosed herein, and the partially encapsulated water is then mixed with sodium bicarbonate to further encapsulate the water, according to certain implementations. In one implementation, the ratio of liquid water to sodium bicarbonate to silica is about 88:8:4. The sodium bicarbonate and silica encapsulated water can be produced using batch processing or continuous processing systems and methods.

Figure 1:
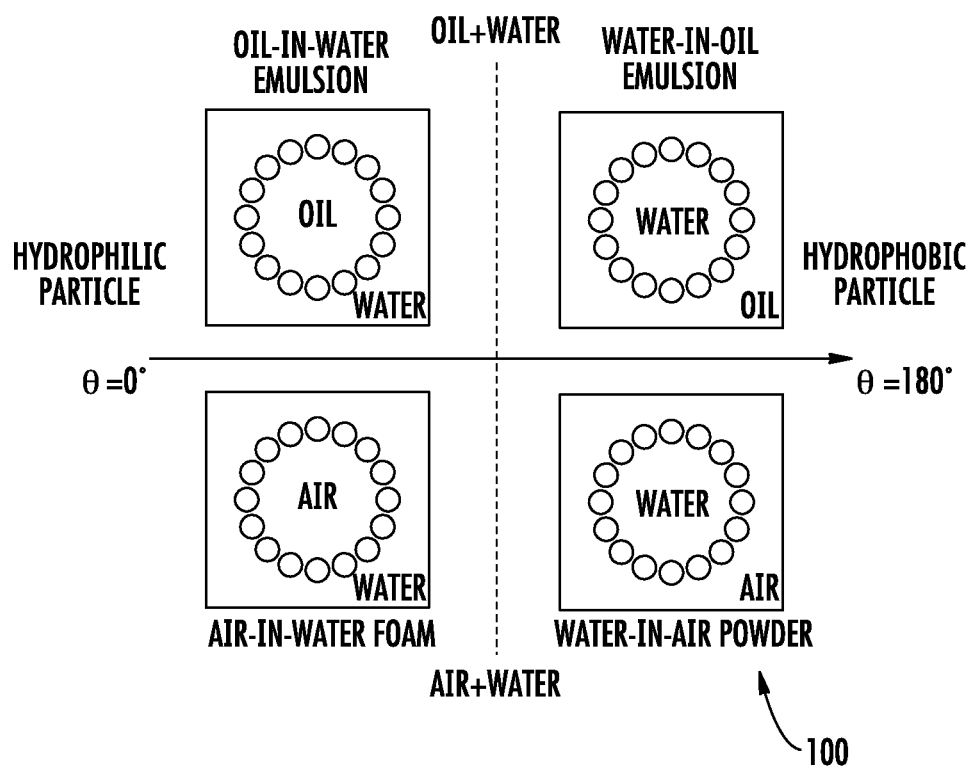
FIG. 1 is a schematic of an encapsulated water droplet.
Figure 2:
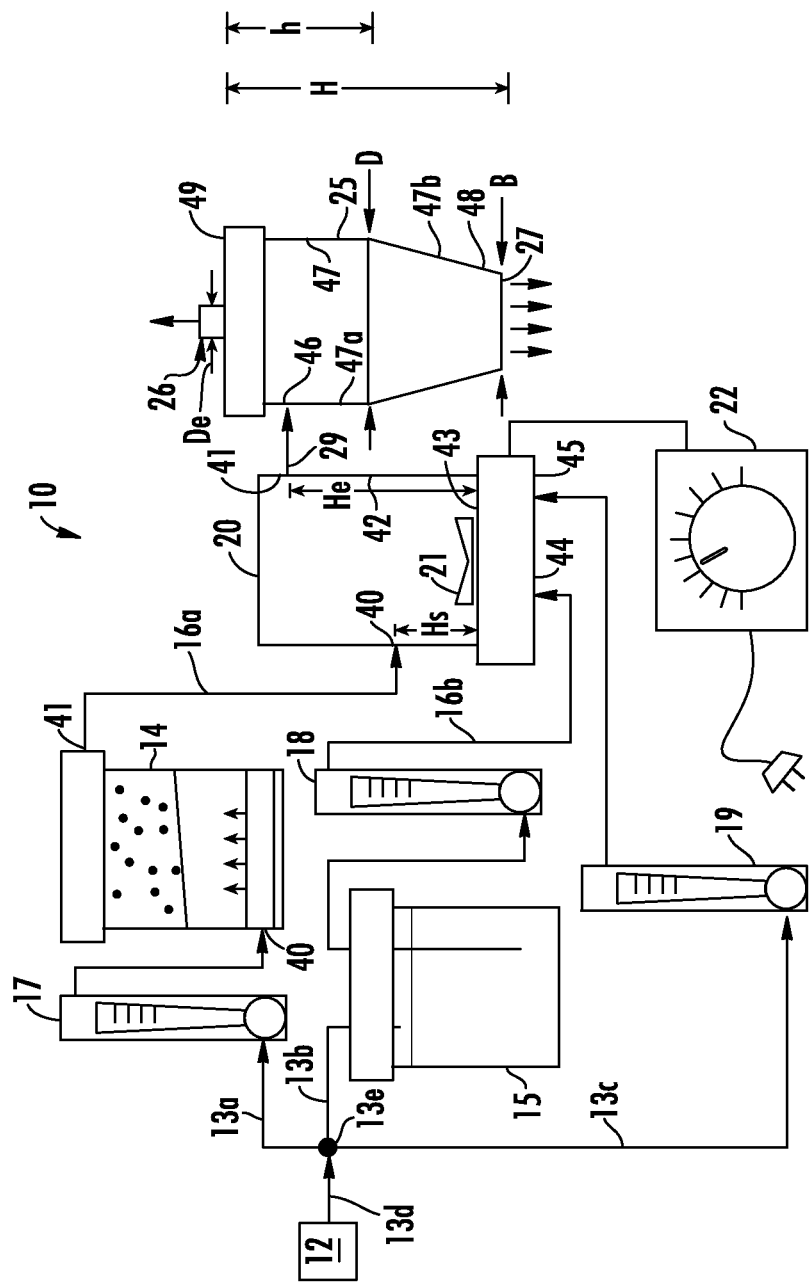
FIG. 2 is a schematic of a system for continuously producing encapsulated water according to one implementation.
Figure 3:
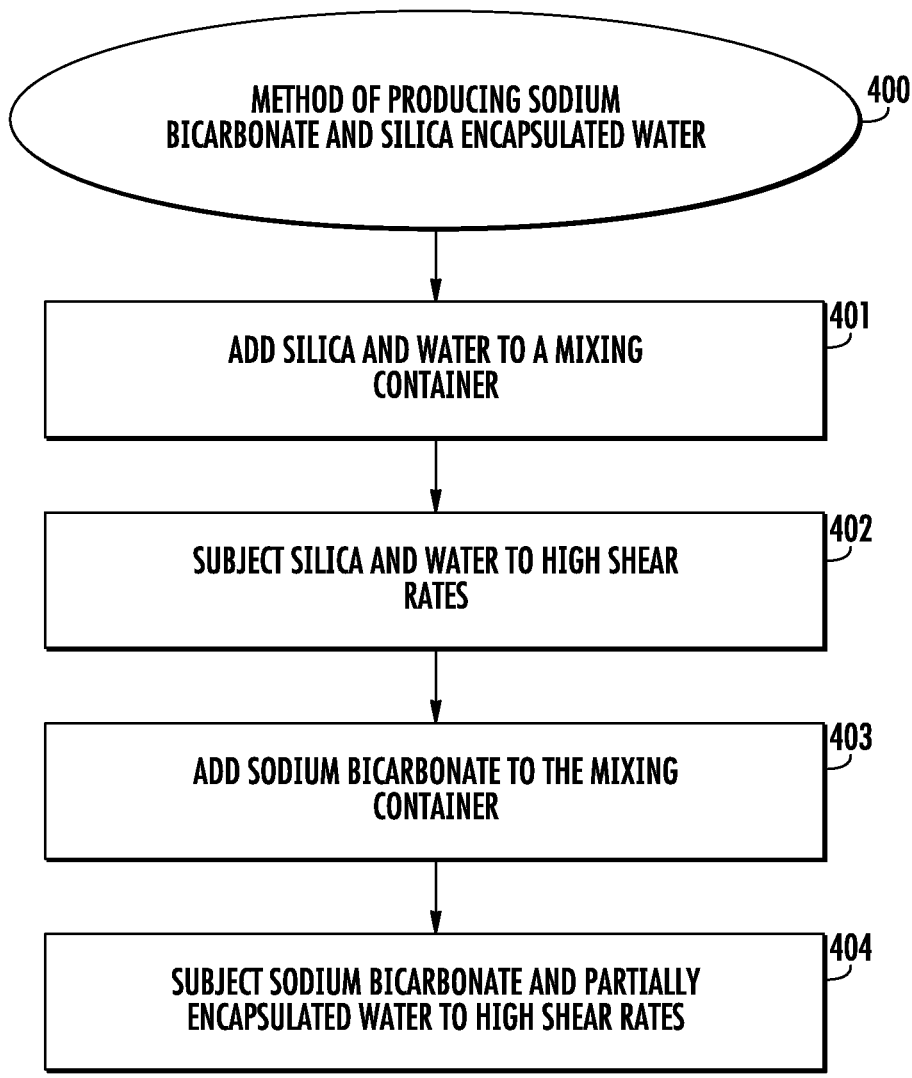
FIG. 3 is a method of producing encapsulated water according to another implementation.
Figure 4:
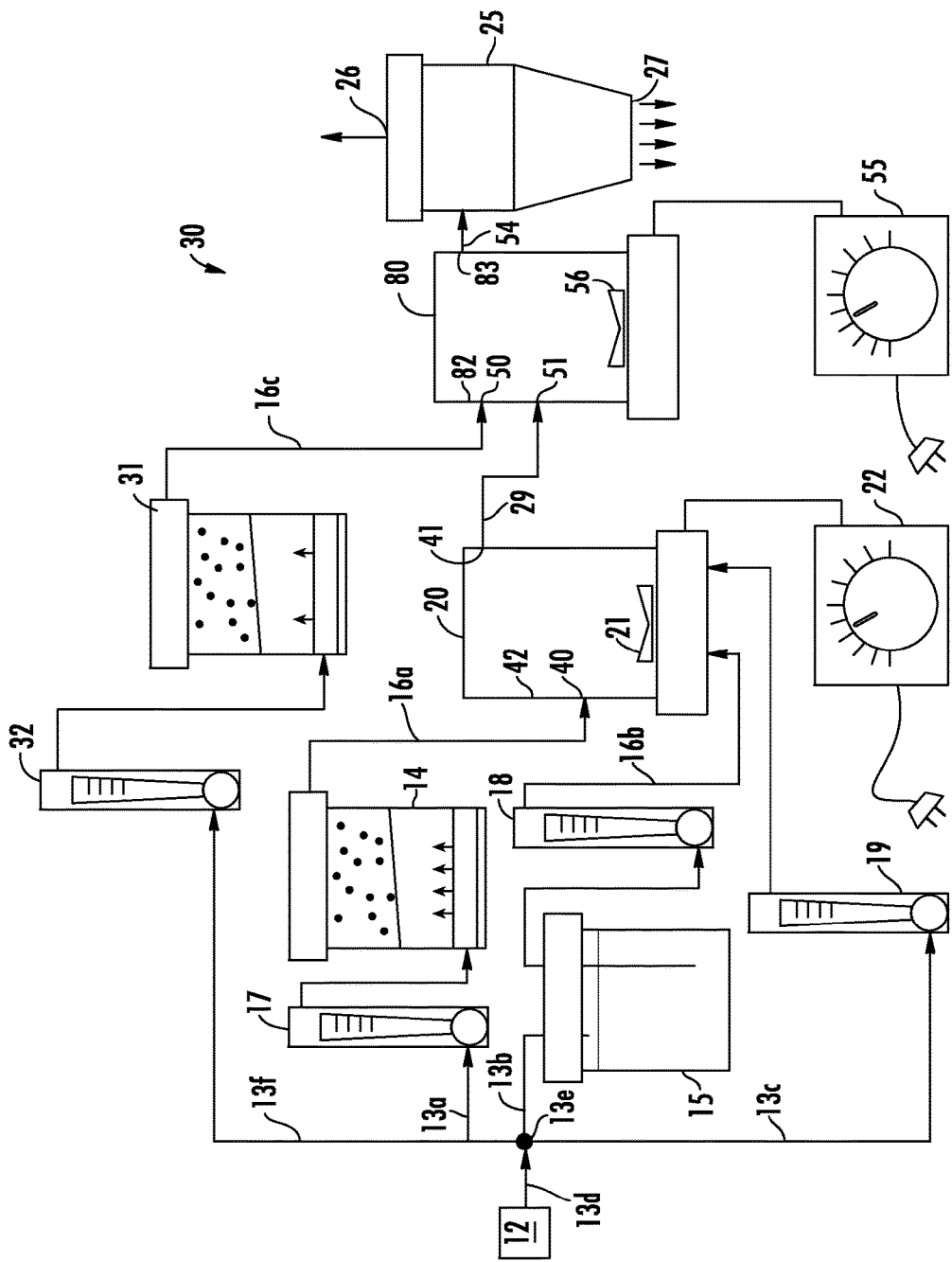
FIG. 4 is a schematic of one implementation of a system for producing encapsulated water according to the method of FIG. 3.

FIG. 2 illustrates a schematic of a system for continuously producing silica encapsulated water according to one implementation. The system 10 includes a pressurized (compressed) gas source 12, a silica reservoir 14, a liquid water reservoir or source 15, a mixing chamber 20, and a cyclone separator 25. Conduit 13d extends from the compressed gas source 12 to a connector 13e, and conduits 13a, 13b, and 13c extend from the connector 13e to the silica reservoir 14, the water reservoir 15, and the mixing chamber 20, respectively. In addition, silica inlet conduit 16a extends between the silica reservoir 14 and the mixing chamber 20, and liquid water conduit 16b extends between the liquid water reservoir 15 and the mixing chamber 20. Conduit 29 extends from the mixing chamber to the cyclone separator 25.

The compressed gas source 12 includes a gas compressor, for example, and the driving gas pressure may be up to about 1.5 atm. To regulate the flow of the driving (or carrier) gas to the silica reservoir 14 and mixing chamber 20, rotameter 17 is disposed in line with conduit 13a and rotameter 19 is disposed in line in conduit 13c. In addition, rotameter 18 is disposed in line with water inlet conduit 16b. For example, in certain implementations, Keys Instrument rotameters may be used for rotameters 17, 18, and 19. In one implementation in which the carrier gas is air and the gas source 12 is set to allow the air to flow at a pressure of 10 psi, the rotameter 17 may be set to about 0.53 grams per second, the rotameter 18 may be set to about 1 milliliter per second, and the rotameter 19 may be set to about 15 cubic feet per hour, according to one implementation. In other implementations, other suitable gas sources (e.g., nitrogen gas) can be used, other suitable gas flow regulation mechanisms may be used, and other suitable carrier gases may be used.

In addition, other implementations may include other types of flowmeters instead of rotameters 17, 18, 19, or the flow of the driving gas may be controlled by other mechanisms, such as engineering the system (e.g., sizing the conduits, regulating the pressure of the driving gas at the pressured gas source) to provide appropriate flow rates and pressure drops.

In operation, silica particles and liquid water are supplied to the mixing chamber 20 in a ratio ranging from about 10:90 to about 2:98, according to certain implementations. For example, the ratio of silica to water can be about 10:90, 9:91, 8:92, 7:93, 6:94, 5:95, 4:96, 3:97, or 2:92. In some implementations, the amount of silica particles can be greater than about 0.9% and up to about 10% of the mixture. In addition, in one implementation, AEROSIL R812S hydrophobic fumed silica of nominal particle size of about 7 nanometers (nm) can be used. However, in other implementations, other suitable types of hydrophobic silica particles may be used.

Disposed within the mixing chamber 20 is at least one rotatable blade 21 that is rotatable by a motor 22 to subject the silica particles and water droplets to high shear rates, which causes the silica particles to encapsulate the water droplets. The literature suggests that shear rate scales with impeller/blade tip velocity either linearly for laminar flow or approximately in a power law manner with an exponent of 1.5 for turbulent flow. For a turbulent flow condition, the estimated average shear rates for the exemplar are approximately 7000 $s^{-1}$. The mean droplet size created by shear decreases with increasing impeller speed in a power law manner with an exponent of approximately −1. See A. W. Pacek et al., "On the Sauter mean diameter and size distributions in turbulent liquid/liquid dispersions in a stirred vessel", Chemical Engineering Science, Vol. 53, No. 11, pp. 2005-2011, 1998 and Sánchez Pérez, J. A., et al. "Shear rate in stirred Lank and bubble column bioreactors." *Chemical Engineering Journal* 124.1 (2006): 1-5. For example, in the implementation shown in FIG. 2, the mixing chamber 20 is a blender, and the rotatable blade 21 includes four, substantially equally spaced apart blades that extend radially outwardly from a rotatable axle. The axle extends upwardly from a lower surface of the mixing chamber 20 and is driven by a variable speed motor. However, in other implementations, other types of rotatable blades in high shear rate mixers can be used to subject the silica and water to high shear rates, the blade can be disposed elsewhere in the mixing chamber, and the motor may not be a variable speed motor. In addition, the motor 22 may be electric or pneumatic powered, according to various implementations.

According to certain implementations, rotating the rotatable blade 21 above 12,500 revolutions per minute (rpm), for 1.25 inch radius impellers, or roughly 50 meters per second impeller speed for about 30 seconds is sufficient to cause droplet breakup and encapsulation of the liquid water droplets by the silica particles.

Driving gas from the gas source 12 flows through conduits 13a-13c to cause silica particles and liquid water to flow from their respective reservoirs 14, 15, respectively, into the mixing chamber 20 and cause the resulting silica-encapsulated water to flow out of the mixing chamber 20. The initial output from the mixing chamber 20 can include silica particles, liquid water that has not been encapsulated, excess air, and liquid water that has been encapsulated by silica particles. However, after about 30 seconds of blending at between about 12,000 and about 18,000 rpm, for example, the non gaseous output from the mixing chamber tends to include less silica particles and liquid water that is not encapsulated. For example, for a ratio of silica to water of about 10:90, the non-gaseous output may include about 85% silica-encapsulated water after blending for about 30 seconds and about 95% silica-encapsulated water after blending for about 60 seconds.

The output product(s) from the mixing chamber 20 flow through conduit 29 into a gas cyclone separator 25, which allows the excess gas to exit from a gas outlet 26 and silica-encapsulated water to exit from a silica-encapsulated water outlet 27. The silica-encapsulated water captured from outlet 27 can be used for various purposes, such as those mentioned above.

The mixing chamber 20 includes a side wall 42 that defines a silica inlet 40 through which silica particles flow from the silica inlet conduit 16a into the mixing chamber 20 and an outlet 41 through which silica-encapsulated water flows into conduit 29 to the gas cyclone 25. In the implementation shown in FIG. 2, the silica inlet 40 is defined in the side wall at a height $H_s$ from a lower surface 43 of the mixing chamber 20, and the outlet 41 is defined in the side wall 42 at a height $H_e$ from the lower surface 43, wherein $H_s$ is less than $H_e$. The lower surface 43 of the mixing chamber 20 defines a water inlet 44 through which liquid water flows from the water inlet conduit 16b into the mixing chamber 20 and a gas inlet 45 through which gas flows from conduit 13c into the mixing chamber 20. However, in other implementations, the silica inlet 40, the water inlet 44, the gas inlet 45, and the outlet 41 can be defined in other suitable places through surfaces of the mixing chamber 20.

The gas cyclone 25 includes a side wall 47 that extends between a lower surface 48 and an upper surface 49 thereof. The side wall 47 includes a substantially cylindrical portion 47a adjacent the upper surface 49, and the substantially cylindrical portion 47a defines an inlet 46 that is configured for receiving silica-encapsulated water from the conduit 29. The side wall 47 also includes a frusto-conically shaped portion 47b between the cylindrical portion 47a and the lower surface 48 of the gas cyclone 25. The lower surface 48 defines a silica-encapsulated water outlet 27 through which silica-encapsulated water that has been separated from excess gas can flow. The upper surface 49 of the gas cyclone 25 defines at least one gas outlet 26 through which excess gas can flow out of the cyclone 25.

In one particular implementation, the ratio of dimensions of the various portions of the gas cyclone 25 are shown in the chart below, wherein D is the inner diameter of the cylindrical portion 47*a*, $D_e$ is the inner diameter of the gas outlet 26, h is the height of the cylindrical portion 47*a*, H is the height of the side wall 47, and B is the inner diameter of the silica-encapsulated water outlet 47.

| $D_e$/D | h/D | H/D | B/D |
|---|---|---|---|
| 0.13 | 0.9 | 1.6 | 0.6 |

However, in other implementations, the ratios of the dimensions of the cyclone 25 may change depending on the parameters of the particular system.

To fluidize the silica particles in the silica reservoir 14, a percolating seeder is disposed within the silica reservoir 14 adjacent a lower surface thereof according to certain implementations. In particular, the seeder includes a cylindrical tubing 51 that defines a plurality of spaced apart holes 52. In one particular implementation, an outer diameter of the tubing 51 is about 0.25 inches, the diameter of the holes 52 is about 0.16 cm, and the holes 52 are spaced apart about 0.25 inches. Gas flows from the conduit 13*a* into the tubing 51 and out through the holes 52. The gas exits the holes 52 and percolates through the silica particles disposed above the tubing 51 and holes 52, causing the silica particles to flow out of the silica reservoir 14 into the silica inlet conduit 16*a* and into the mixing chamber 20. The tubing 51 can be secured in position using an epoxy or other suitable fastener.

The water reservoir 15 includes upper and lower surfaces and a side wall that extends between the upper and lower surfaces. Conduit 13*b* extends through an air inlet defined in the upper surface to supply air above the surface of the liquid water contained in the water reservoir 15. Water inlet conduit 16*b* extends through a water outlet defined in the upper surface of the reservoir 15 and toward a lower surface of the water reservoir 15 to allow water to flow up through the water inlet conduit 16*b* and into the mixing chamber 20. In addition, the liquid water can include tap water or deionized water, for example.

According to another implementation, the liquid water is encapsulated with sodium bicarbonate and silica. Thus, disclosed herein is a microparticle comprising a core and a shell surrounding the core, wherein the core comprises water and the shell comprises silica and or sodium bicarbonate, and wherein the microparticle is at least about 90% water by mass. In some examples, the microparticle comprises at least about 90%, 91%, 92%, 93%, 94%, 95%, 96%, 97%, or 98% water by mass. In other examples, the shell comprises from about 9% to about 5% sodium bicarbonate by mass, e.g., about 9%, 8%, 7%, 6%, or 5% sodium bicarbonate by mass. The shell can also comprise from about 1% to about 5% silica by mass, e.g., about 1%, 2%, 3%, 4%, or 5% silica by mass.

FIG. 3 illustrates a method 400 of producing sodium bicarbonate and silica encapsulated water according to various implementations. Beginning at step 401, silica particles and liquid water are added to a mixing chamber. In step 402, the silica and water are subjected to high shear rates in the mixing chamber such that the silica partially encapsulates the water. In certain implementations, this step is performed for about 30 seconds. In Step 403, sodium bicarbonate particles are added to the mixing chamber. In Step 404, the sodium bicarbonate particles and partially encapsulated water are subjected to high shear rates such that the sodium bicarbonate particles encapsulate the partially encapsulated water. In certain implementations, this step is performed for about 10 to about 30 seconds. The resulting product is water that is encapsulated by silica and sodium bicarbonate particles. The ratio of water to sodium bicarbonate to silica is about 80:18:2 to about 88:8:4 according to certain implementations. In addition, in various implementations, the silica particles include hydrophobic silica particles, and in some implementations, the silica particles include hydrophobic fumed silica particles.

The silica and sodium bicarbonate-encapsulated water can be batch or continuously produced, according to certain implementations. Once produced, the encapsulated water can be pre-packaged for its end use, such as for one or more of the end uses mentioned above, according to some implementations.

FIG. 4 illustrates a system 30 for continuously producing silica and sodium bicarbonate-encapsulated water according to one implementation. The system 30 includes the elements of system 10, except as noted below, and further includes a sodium bicarbonate reservoir 31 that contains sodium bicarbonate particles and a second mixing chamber 80 disposed between the first mixing chamber 20 and the gas cyclone 25.

The driving gas source 12 is in fluid communication with the sodium bicarbonate reservoir 31 via conduit 13*f*. The driving gas flows through conduit 13*f* to drive sodium bicarbonate particles into a sodium bicarbonate inlet conduit 16*c* and into the second mixing chamber 80. For example, in one implementation, the sodium bicarbonate reservoir 31 can include a percolating seeder as is described above in relation to the silica reservoir 14 of FIG. 2 to fluidize the sodium bicarbonate particles. In addition, the flow of driving gas into the silica reservoir 14 may be regulated by rotameter 32 or another type of flow meter, or the system may be engineered with prescribed pressure drops and fixed flow rates such that a rotameter or other flow meter are not necessary.

Sodium bicarbonate may flow into the second mixing chamber 80 at any time. Also, as shown, the driving gas from the gas source 12 is used to cause the sodium bicarbonate to flow from the sodium bicarbonate reservoir 31 to the second mixing chamber 80, but in other implementations, the driving gas can be supplied by a second gas source (not shown).

The sodium bicarbonate inlet conduit 16c extends between the sodium bicarbonate reservoir 31 and a sodium bicarbonate inlet 50 defined in a side wall 82 of the second mixing chamber 80 to allow fluidized sodium bicarbonate particles to flow into the second mixing chamber 80. The silica-encapsulated water produced in the first mixing chamber 20 and excess air from the first mixing chamber 20 flow from the first mixing chamber 20 into the second mixing chamber 80 via conduit 29 and inlet 51 defined in the sidewall 82. The second mixing chamber 80 is configured for subjecting the sodium bicarbonate particles and the silica-encapsulated water to high shear rates using rotating blades 56 such that the sodium bicarbonate particles further encapsulate the silica-encapsulated water. The rotating blades 56 are rotated by a variable speed motor 55. The sodium bicarbonate and silica-encapsulated water flows out of the second mixing chamber 80 through outlet 83 and into conduit 54 to the gas cyclone separator 25.

Various modifications of the devices and methods in addition to those shown and described herein are intended to fall within the scope of the appended claims. Further, while only certain representative devices and method steps disclosed herein are specifically described, other combinations of the devices and method steps are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms.

What is claimed is:

1. A microparticle, comprising: a core and a shell surrounding the core, wherein the core comprises water and the shell consists essentially of silica and sodium bicarbonate, and wherein the microparticle is at least about 90% water by mass.

2. The microparticle of claim 1, wherein the microparticle comprises from about 9% to about 5% sodium bicarbonate by mass.

3. The microparticle of claim 1, wherein the microparticle comprises from about 1% to about 5% silica by mass.

4. The microparticle of claim 1, wherein the microparticle is at least 95% water by mass.

5. The microparticle of claim 1, wherein the microparticle is at least 98% water by mass.

* * * * *